United States Patent Office 3,233,026
Patented Feb. 1, 1966

3,233,026
METHOD OF PRODUCING ANION-EXCHANGE FIBERS, FILMS, AND THE LIKE
George A. Richter, Jr., Abington, Charles H. McBurney, Meadowbrook, and Benjamin B. Kine, Levittown, Pa., assignors to Rohm & Haas Company, Philadelphia, Pa., a corporation of Delaware
No Drawing. Filed May 14, 1959, Ser. No. 813,079
7 Claims. (Cl. 264—178)

This invention relates to a process for producing new and improved anion-exchange fibers, films, and the like having at least a small dimension of the order of one-tenth to twenty mils and to methods for the production thereof. This application is a continuation-in-part of our copending application Serial No. 587,925, filed May 29, 1956, now Patent No. 2,933,460.

It is an object of the present invention to provide processes to produce filmy structures, within which term it is meant to include fibers, filaments, or pellicles and films having at least one dimension of one-tenth to twenty mils, formed substantially entirely of cross-linked polymeric materials, at least those polymer molecules at the surface of the structure having in the polymer molecule anion-exchange groups. Anion-exchange fibers of cross-linked structure, as obtained in accordance with the present invention, may possess a wide range of ion-exchange capacity, all the way from relatively low values of 0.3 to 1 or more where low capacities are desired up to relatively high capacities of 6 to 8 milli-equivalents per gram.

In accordance with the present invention, a process is provided for producing a filmy, polymeric, shaped structure as herein defined having at least one small dimension of the order of one-tenth to twenty mils comprising a cross-linked addition copolymer, at least 7 mole percent of the units of said copolymer containing anion-exchange groups, and at least one-half mole percent of the units derived from the initial linear polymer molecules being attached to units derived from other initial polymer molecules to provide cross-linking of the copolymer.

The present invention also provides a process for making filmy, polymeric, shaped structures having at least one small dimension of one-tenth to twenty mils comprising forming into substantially the shape desired a linear addition copolymer containing cross-linkable units and units consisting of those containing anion-exchange groups and those containing groups convertible into anion-exchange groups and then reacting the cross-linkable units to form cross-links between molecules of the copolymer while the copolymer is maintained in the aforesaid shape.

The product of the process of the present invention is a structure having at least one small dimension of the order of one-tenth to twenty mils and comprising a cross-linked product of a linear addition polymer, at least 7 mole percent of the units of the product containing anion-exchange groups, and at least one-half mole percent of the units derived from the initialu linear polymer molecules being attached to units derived from other initial polymer molecules to provide cross-links in the product. As many as 30 to 50 mole percent of the units of the initial linear polymer molecules may be attached in cross-linked manner to the units of other initial polymer molecules, but for most purposes the polymers contain from 1 to 20 mole percent of cross-linking unith to assure adequate insolubiliy and limited swelling.

In accordance with the present invention, there is first obtained or produced a linear addition polymer containing within the polymer units which are adapted to be cross-linked, which will hereinafter be termed "cross-linkable units," and units which either have anion exchange groups or contain groups which are adapted to be converted by subsequent treatment into anion exchange groups. These units as will appear hereinafter may be one and the same so that it is within the scope of the invention to start with certain homopolymers. On the other hand, the more frequent and generally preferred situation is that in which the anion exchange unit or units adapted to be converted into anion exchange units are different from the units which are adapted to serve as cross-linking units. Examples of anion exchange groups include amine groups, quaternary ammonium groups and sulfonium groups.

For convenience, the term "spinning" is used in a broad sense to include not only the conversion of the polymeric material, either in molten form or as a dispersion or solution, into the form of filaments and fibers but also the formation of films, pellicles, or sheets from such polymer masses, such as by extrusion through an elongated orifice, slit, or slot.

The linear polymers containing the units specified are formed into fibers, films, or the like by procedures more completely described hereinafter. After formation of the filmy structure, the linear polymers are converted into cross-linked structures. If desired, the linear polymers may be oriented in the direction of at least one long dimension of the structure by stretching before the cross-linking is effected so that cross-linking serves to fix within the structure the oriented condition of linear portions of the ultimate cross-linked polymer molecules within the structure. When the linear polymer contains units which require modification to introduce the anion exchange groups, this modification may be performed at any time before or during spinning, or it may be performed as the final step after the cross-linking.

In one embodiment of the invention, the linear polymer is formed by copolymerization of monomers containing anion exchange groups with monomers which provide units adapted to be cross-linked after formation of the fiber. The linear addition polymer is preferably a copolymer of 7 to 80 mole percent of units containing anion exchange groups and at least one mole percent of units adapted to serve in cross-linking. Examples of monomers containing anion exchange groups include aminoalkyl acrylates, methacrylates, or itaconates, e.g., $\beta$-aminoethyl acrylate, methacrylate or itaconate di-ester, 5-aminopentyl methacrylate or itaconate diester, $\beta$-morpholinoethyl acrylate, methacrylate or itaconate di-ester, 3-aminopropyl acrylate, methacrylate or itaconate di-ester, 2-amino-2-methylpropyl acrylate, methacrylate or itaconate di-ester, $\beta$-N-methylaminoethyl acrylate, methacrylate or itaconate di-ester, $\beta$-N,N-dimethylaminoethyl acrylate, methacrylate or itaconate di-ester; N-aminoalkyl acrylamides, methacrylamides, or itaconamides, e.g., N-$\beta$-amino-ethyl acrylamide or methacrylamide, N-5-aminopentyl acrylamide or methacrylamide, N,N-di-$\beta$-aminoethyl acrylamide or methacrylamide, N,N-di-$\beta$-methylaminoethyl acrylamide or methacrylamide, N,N-di-$\beta$-dimethylaminoethyl acrylamide or methacrylamide, N-$\beta$-dimethylaminoethyl acrylamide or methacrylamide, N-$\beta$-diethylaminoethyl acrylamide or methacrylamide, vinyloxyalkylamines, e.g., $\beta$-vinyloxyethylamine, dimethyl-($\beta$-vinyloxyethyl)-amine, vinylthioalkylamines, such as dimethyl-($\beta$-vinylthioethyl)-amine; quaternary ammonium compounds obtained by the alkylation of any of the amines so far mentioned by alkylating agents (which is herein intended to include aralkylating agents and substituted aralkylating agents), such as methyl chloride, ethyl chloride, benzyl chloride, allyl chloride, substituted allyl chloride, e.g., dodecylallyl chloride, dodecyl chlorides, alkylbenzyl chlorides, e.g., octylbenzyl chlorides (from diiosbuytlene), any chloromethylated aromatic-like compound, e.g., chlorobenzyl chloride, chloromethylated thiophene, chloromethylated furane, chloromethylated naphthalene, or corresponding bromides or iodides, e.g., phenoxyethyl bromide, methyl iodide; dimethyl sulfate, dimethyl sulfite, dimethyl phosphite, ethylene oxide, propylene oxide, styrene oxide, and butylene oxide. For example, a mixture of 17.9 grams (0.109 mole) of monomeric dimethylaminopropylacrylamide, 13.8 grams (0.109 mole) of benzyl chloride, 74 grams of absolute ethanol (30% solids) and di-β-naphthol was heated to reflux for two hours. The product was isolated by concentration in vacuo. Any of the quaternary ammonium monomeric compounds disclosed in copending United States applications Serial No. 441,643, filed July 6, 1954; Serial No. 461,285, filed October 8, 1954; Serial No. 495,784, filed March 21, 1955; and in the United States Patents 2,810,713 and 2,840,546, all in the hands of a common assignee may be used. Examples of these quaternary compounds include (β-methacryloxyethyl) trimethylammonium hydroxide, chloride, methosulfate, bromide, and so on, the dodecenyl chloride quaternary of 1-(β - dimethylaminoethyl)-3-vinyl-imidazolinone-2 and the benzyl chloride quaternary of 1-(β-dioctadecylaminoethyl)-3-vinyl - imidazolidinone - 2, (β - acryloxyethyl) trimethylammonium chloride, hydroxide, and so on, (β-methacrylamidoethyl)triethylammonium chloride, hydroxide, and so on, (β-vinyloxyethyl)trimethylammonium chloride, hydroxide, and so on.

The monomers which provide the cross-linkable units in the copolymer include glycidyl acrylate and methacrylate, ureidoalkyl esters, such as ureidoethyl acrylate and methacrylate, ureidoethyl vinyl ether, ureidopentyl vinyl ether, ureidoisobutyl vinyl ether, N-vinyloxyalkyl carbamates, such as N-β-vinyloxyethyl carbamate, acrylamides, methacrylamides, N-mono-substituted acrylamides and methacrylamides, such as acrylamide per se, methacrylamide per se, N-methyl- or N-ethyl acrylamide or methacrylamide, hydroxyethyl vinyl ether or sulfide, hydroxypentyl vinyl ether or sulfide, 2-isocyanato vinyl ethers, such as 2-isocyanato-2,2-dimethylethyl vinyl ether, aminoalkyl acrylates and methacrylates, such as aminoethyl acrylate, dimethylaminoethyl acrylate and N-dimethylaminoethyl acrylamide, alkoxymethyl vinyl sulfides, such as methoxymethyl vinyl sulfides, alkoxymethyl thioalkyl acrylates, methacrylates, and itaconates, such as methoxymethylthioethyl acrylate. In general, the cross-linkable monomer is a monoethylenically unsaturated compound containing a reactive substituent, such as carboxyl, hydroxyl, amido, amino, epoxy, isocyanato, or ureido groups, and the like.

Besides units containing cross-linkable functionality and units containing ion exchange groups, the copolymer may contain other units that serve neither of these purposes. Such additional monomer units may be termed inactive units. Examples of such units include vinyl chloride, vinyl esters of organic acids, such as acetic, butyric, propionic, lauric, and so on acids, ethylene, isobutylene, styrene, vinyltoluene, acrylonitrile, methacrylonitrile, vinylidene chloride, vinyl ethers, such as methyl vinyl ether and so on.

The copolymers of these various units may be produced by bulk, solution, emulsion or suspension procedures. In the copolymerization the usual initiators or catalysts may be used, of which the following are typical: α,α'-bis-azoisobutyronitrile, dimethyl azobisisobutyrate, 2,2'-azobis-2,4-dimethylvaleronitrile, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "per-salts" such as ammonium persulfate and ammonium perborate. The catalysts are used in amounts from 0.2% to 5%, and preferably from 0.5% to 2%, based on the weight of the polymerizable compound or compounds.

The polymerization may be effected at temperatures from about room temperature up to about 100° C. for periods of time ranging from a few minutes to several hours. In producing aqueous emulsion copolymer dispersions, any of the initiators above may be used, but it is generally preferable to use ammonium, sodium, or potassium persulfate in conjunction with a reducing agent, such as a sulfite, bisulfite, metabisulfite or hydrosulfite of an alkali metal, to provide a redox system. The addition of a few parts per million of a polyvalent metal, such as iron, may also be used in the emulsion polymerization procedure. The monomer or mixture of monomers may be added gradually or in successive increments at spaced intervals through the polymerization or the entire monomer or monomer mixture may be polymerized as a single batch, regardless of which polymerizing system or technique is employed.

As emulsifiers when emulsion polymerization is employed, there may be used any of the conventional anionic, cationic, or non-ionic emulsifiers, such as fatty acid soaps, including sodium oleate, sodium laurate, sodium stearate and so on, also sodium dodecylsulfate or sulfonate, sodium pentadecylbenzenesulfonate, sodium octylphenoxyethoxyethylsulfonate, octylphenoxypolyethoxyethanol, tetradecylthiopolyethoxyethanol, ethylene oxide condensates of tall oil and other long-chained fatty acids, lauryldimethylbenzylammonium chloride, dodecylbenzyltrimethylammonium chloride, or any of the many wetting agents and emulsifiers which are generally advocated for forming aqueous emulsions. Some emulsifiers are better for handling a given monomer or a mixture of monomers than others.

The product obtained by bulk polymerization may be directly used in a melt-spinning or the polymeric product thereby obtained may be dissolved in a suitable solvent, such as water if the polymer is soluble therein or an organic solvent in which it is soluble, and the dissolved polymer may be spun either by a wet or a dry system, using as coagulants in the wet-spinning organic liquids which are not solvents for the polymer but are solvents for the water when aqueous solutions are spun and either aqueous media or organic solvents in which the polymer is insoluble but in which the solvent of the spinning solution is soluble when solutions in organic solvents are spun or extruded through slot orifices to produce films. The product obtained by solution polymerization may be directly wet- or dry-spun or the polymer thereof may be precipitated or in some other manner coagulated and dissolved in another solvent to prepare a spinning solution. The precipitated or coagulated polymer may also be spun by melt-spinning if desired. Similarly, the product obtained by suspension polymerization may be recovered and used in melt-spinning or dissolved in a suitable solvent and either wet- or dry-spun. The aqueous dispersions obtained by emulsion polymerization may be directly spun either by a wet- or a dry-spinning system or the polymer therein may be coagulated and then spun by a melt-spinning operation or by a wet- or dry-spinning operation.

The spinning of the polymer mass, either as a molten polymer or as a solution or dispersion thereof, is then carried out, as more particularly described hereinafter, to form films, filaments, fibers or pellicles or the like, and after the formation of such structures treatment is carried out to effect the cross-linking of the polymer. If stretching is employed, substantially all of the cross-linking should be effected after the stretching. The particular cross-linking procedure employed depends upon the components of the polymer constituting the fiber or film.

When the polymer contains epoxy groups, as in the case of copolymers of glycidyl acrylate or methacrylate, the cross-linking may be effected simply by heating the structure, such as from 60° C. to 250° C., the upper limit being dependent upon the other monomers present and being insufficiently high to destroy the film or fiber structure. The time generally used is inversely proportional to the temperature. For example, a period of a few seconds to 15 seconds may be proper in the upper regions of the temperature range given, whereas a period of time of a half an hour to several days may be desirable at lower temperatures in the range cited. This cross-linking by heat may be accelerated by simultaneous treatment with 0.5 to 1%, by weight of the polymer structure, of a catalyst, such as p-toluenesulfonic acid, sulfuric acid, phosphoric acid, aluminum chloride, and the like.

Instead of relying upon heat with or without a catalyst or accelerator, the epoxy groups in such polymers may be reacted with polyamines containing at least two primary, secondary, or tertiary amine nitrogen atoms. It is believed that the cross-linking action obtained with the polyamines when they contain tertiary amine nitrogen groups is attributable to quaternization. The temperatures and times may fall within the ranges of temperature and time given when heat alone is employed. The diamine may be applied in a solvent, such as water, at a concentration of 5% to 10%, but when it is a liquid it may be applied directly without dilution in a solvent. The filmy structure may be impregnated with the diamine by simple immersion or by spraying, or in any other suitable manner. Examples of polyamines include ethylene-diamine, diethylenetriamine, triethylenetetramine, hexamethylenediamine, N,N'-dimethyl-ethylenediamine, N,N,N',N'-tetramethylethylenediamine, N,N,N',N'-tetraethyl - ethylenediamine, and N,N,N',N'-tetraethyl - hexamethylenediamine.

When the cross-linkable units of the polymer contain ureido or carbamato groups or linkages, cross-linking may be effected by heat alone as in the case of the polymers of glycidyl methacrylate, the temperatures and times being generally in the same ranges as given for the glycidyl-containing polymers. They also may be cross-linked by reaction with aldehydes, especially formaldehyde, or by urea or methylol derivatives of urea, such as dimethylol urea. For this purpose, the formaldehyde may be applied as a gas or any aldehyde, including formaldehyde, or urea or derivatives of urea may be applied from solutions in water or alcohol, and the impregnated structure is heated to effect cross-linking at temperatures ranging from 30° to 250° C. for times of the same general range as outlined hereinabove in respect to the heating of polymers of glycidyl acrylates. Besides aldehydes, polyisocyanates or polyisothiocyanates, such as toluene-2,4-diisocyanate, hexamethylene-diisocyanate, and the like, may be used for effecting cross-linking. With them, temperatures from room temperature or lower down to about 0° C. or higher up to 250° C. may be employed, depending upon the particular polyisocyanate and the particular polymer. The times may be as above, in any case the time employed being sufficient to give the desired cross-linking.

When the cross-linkable groups in the polymer are isocyanate groups, the cross-linking may be effected by any compound having at least two reactive hydrogen atoms, including aldehydes, polyamines, such as those mentioned hereinabove for cross-linking the polymers of glycidyl acrylates, polyhydric alcohols, such as glycols, including ethylene glycol, diethylene glycol, hexamethylene glycol, glycerol, sorbital, sorbitan, and sorbide, polythiols, especially the dithiols such as ethylene dithiol, p-xylylene dithiol, polyhydroxyphenols, such as resorcinol, pyrocatechol, orcinol, tannic acid, polycarboxylic acids, and especially dicarboxylic acids, such as succinic acid, adipic acid, sebacic acid, o-phthalic acid, terephthalic acids, and so on. Treatment may be effected by imersion or spraying in the polyfunctional reactant, if it is a liquid or molten at the temperature employed, or by immersion or spraying of a solution of the polyfunctional reactant. The heating may be effected while the polymeric structure is immersed in the body of reagent, but preferably excess reagent is removed and the polymer structure is heated at temperatures from about 0° C. up to 100° C. or more, such as up to 200° C., for sufficient time to effect cross-linking, which may amount to a few seconds at the high temperature up to an hour or more at the lower temperature of the range.

When the cross-linkable units in the polymeric structures contain amine groups, cross-linking may be effected by polycarboxylic acids of polyisocyanates, such as any of those mentioned above, and the reaction may be effected at the temperatures mentioned hereinabove. When the cross-linkable units contain amine groups having tertiary nitrogen atoms, the cross-linking may be effected by quaternization by means of poly-halides and especially di-halides, including ethylene dichloride, xylylene dichloride, and hexamethylene dichloride. The fimly structure may be formed of homopolymers of monomeric amine, such as of diethylaminoethyl methacrylate, whose units have anion exchange characteristics and are cross-linkable by the dihalides just mentioned.

When the cross-linkable units contain hydroxyl groups, the cross-linking may be effected by means of aldehydes, such as formaldehyde, acetaldehyde, glyoxal, and the like, also aldehyde derivatives of urea, such as dimethylol urea, reaction being effected at temperatures of about 30° C. to 250° C. for periods of several hours at the lower temperature to a few seconds at the higher temperatures. Besides aldehydes and their derivatives, cross-linking may be effected by polyisocyanates or polyisothiocyanates, such as those mentioned hereinabove, polycarboxylic acids, such as those mentioned hereinabove, and by polybasic acid halides, such as succinoyl chloride, adipoly chloride, and so on. These reactions may be effected within the temperature ranges mentioned hereinabove and in similar time periods.

The cross-linkable units of the polymer may consist of alkoxymethyl vinyl sulfide units, and especially methoxymethyl vinyl sulfide, which can be converted to thiol units by hydrolysis and the thiol units then converted to disulfide linkages by mild oxidation.

The alkoxymethyl vinyl sulfide compounds that may be used as monomers have the structure of the formula

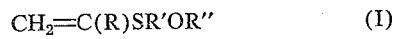

$$CH_2 = C(R)SR'OR'' \qquad (I)$$

where

R is selected from the group consisting of hydrogen and methyl,

R' is a methylene, ethylidene or isopropylidene group, and

R'' is an alkyl group having 1 to 8 carbon atoms, but is preferably methyl.

Since part or all of the —R'OR'' portion of the compound is eliminated in the subsequent cross-linking, it is generally preferred to polymerize the simplest compound, namely, the methoxymethyl vinyl sulfide, in preparing the polymers to be used in making the fibers and films of the present invention. Generally, in making filmy products of the present invention, there may be used copolymers containing from one-half to 30 mole percent of the sulfide monomer and preferably between 5 and 20 mole percent thereof. It has been found that polymers containing the sulfide of Formula I are self-cross-linking when subjected to mild oxidation at elevated temperatures as will be described hereinbelow.

The hydrolysis of the alkoxymethyl groups (in the alkoxymethyl vinyl sulfide polymers) to form thiol groups may be effected in acid solutions having concentrations of anywhere from ¼% to 25% or higher. When the coagulating bath used in wet-spinning techniques is an acid bath, it appears that at least some, if not all, of the hydrolysis can be effected at this stage. The oxidation requires mild oxidation agents only, such as the presence of air, or more conveniently the treatment with dilute solutions of at least about 0.1% of an oxidizing agent, such as an aqueous solution of hydrogen peroxide, chlorine, sodium hypochlorite, sodium hypoiodite (e.g., formed by dissolving iodine in aqueous sodium hydroxide at a pH of 10 or less), calcium hypochlorite, nitric acid, potassium permanganate, peracetic acid, performic acid, or potassium dichromate, or alcoholic solutions of iodine may be employed such as a solution of at least 0.1% up to 25% or more iodine in methanol, ethanol, isopropanol, and so on.

The polymer product may be treated with a solution of the oxidizing agent at any temperature from room temperature up to about 80° C. or higher for various periods of time. For example the treatment may be effected for about one-quarter of an hour to an hour at room temperature and for comparatively reduced periods of time from about 10 seconds to 15 minutes at about 80° C. Longer periods of time may be employed at any of the temperatures in the range mentioned but generally the periods mentioned are adequate. The permissible upper limits of the conditions of temperature, time, and concentration depend on the individual oxidizing agent and they are correlated to provide a mild oxidation which serves to effect cross-linking, but does not go appreciably further to form substantial amounts of sulfone and sulfonic acid groups. The upper limit of concentration depends on the individual agent and the temperature at which the oxidation is carried out. If the temperature is kept low, such as at normal room temperatures, concentrations as high as 0.5 to 5% or in some cases even up to 10% to 25% may be employed without substantial conversion of the —SH groups to sulfones and/or sulfonic acids. At higher temperatures up to 50° C. to 80° C., the concentration of the stronger agents must be progressively lowered to avoid substantial conversion to sulfones and sulfonic acids. However, partial oxidation to the sulfonic acid stage may be desired to provide cation exchange groups in the polymer cross-linked through the disulfide linkages.

In many cases, it may be desirable to carry out the main part of the heating to effect the cross-linking after a relatively limited period of treatment in a solution of the oxidant which serves primarily to effect impregnation of the fiber, film, filament bundle or the like with the oxidant and may or may not serve to effect a portion of the desired cross-linking. The subsequent heating stage in such event may be termed a baking or curing step and may be carried out at temperatures of 50° C. to 200° C. but, as discussed hereinbefore, the upper limit of temperature in this stage is dependent on the particular oxidant employed. In such cases, after removal of the polymer product from the medium containing the oxidizing agent, the excess of such medium may be removed as by suction, squeezing, or air-sequeegeeing and the oxidation which may or may not have been started while the polymer product is immersed in the medium containing the oxidizing agent may be pushed to completion by subsequently heating the polymer product at elevated temperatures from about 80° C. to 200° C. for a period of time ranging from about 5 minutes to about half an hour at the higher temperature to about 15 minutes to about an hour or two at the lower temperature.

The cross-linkable units of the polymer may consist of alkoxymethylthiolalkyl acrylate, methacrylate or itaconate units. These units are hydrolyzed to thiol groups in the same manner as the alkoxymethyl vinyl sulfide units hereinbefore described and mild oxidation as described above serve to form disulfide linkages.

The discussion so far has dealt with polymers containings units having anion exchange groups and cross-linkable units. An alternative procedure as mentioned briefly above is to produce linear polymers containing units adapted to be cross-linked and also units having groups adapted to be converted into anion exchange groups. The latter type of units may be called precursory units. Examples of precursory units include those obtained from acrylonitrile and esters of monoethylenically unsaturated acids, such as the acrylates, methacrylates and itaconates of alcohols having from 1 to 18 carbon atoms such as ethanol, methanol, isopropanol, hexanol, octanol, decanol, octadecanol, and benzyl alcohol. Acrylamide, methacrylamide, or N-substituted acrylamides or methacrylamides may also be used. Furthermore, the acrylates, methacrylates, itaconates, nitriles, and amides mentioned above serve as precursors for the introduction of anion exchange groups, such as amine groups and quaternary ammonium groups. Thus, aminolysis of those acrylates, methacrylates, and itaconates may be effected with polyamines, and especially diamines, such as dimethylaminoethylamine, or any of those mentioned above or any of those mentioned in lines 7 to 20 of page 6 of Serial No. 441,643, filed July 6, 1954. The amine-containing units may then, if desired, be converted to quaternary ammonium-containing units by alkylation by means of any of the alkylating agents mentioned hereinabove. The aminolysis and quaternization may be effected in the same way as in Serial No. 441,643 above and the disclosure therein of amines used, alkylating agents used and the procedures and conditions for aminolysis and quaternization are incorporated herein by reference. Units derived from vinyl aromatic compounds such as styrene, vinyltoluenes, vinylnaphthalenes, etc., serve as precursors for introduction of anion exchange groups also. Thus, copolymers thereof with cross-linkable units can be haloalkylated, and especially chloromethylated, and the haloalkylated groups are reacted with tertiary amines, such as trimethylamine, triethylamine, triethanolamine, etc., to form anion exchange quaternary ammonium groups or with primary or secondary amines, such as methylamine, dimethylamine, ethanolamine, or diethanolamine, to form anion exchange amine groups, or with sulfides of the formula $R^0$—R—$R^2$, where $R^0$ is an alkyl group of one to for carbon atoms and $R^2$ is a hydroxy-alkyl group having one to four carbon atoms, to form anion exchange sulfonium groups of the formula $$-\underset{\underset{OH}{|}}{\overset{\overset{R^0}{|}}{S}}-R^2$$

the OH anion being convertible to any other, such as chloride, bromide, or the like. The conversion of haloalkylated groups to tertiary sulfonium groups is effected by reacting the haloalkylated polymer with the aforesaid organic sulfide. It is preferred that the reaction of the haloalkylated copolymer and the organic sulfide be carried out in the presence of an organic liquid which is a solvent for the organic sulfide and which is also capable of swelling the particles of the haloalkylated copolymer. Hydrocarbons, such as benzene or toluene, and halogenated hydrocarbons, such as ethylene dichloride or tribromoethane, are suitable for this purpose. The reaction takes place fairly readily and temperatures up to the boiling point of the reaction mixture can be used. The reaction which takes place is typified by the following equation, which represents the reaction of a chloromethylated copolymer of styrene with methyl ethyl sulfide:

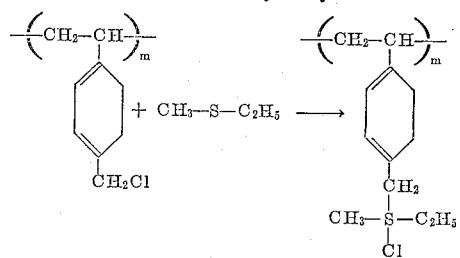

Homopolymers of amine-containing monomers, such as of diethylaminoethyl methacrylate, may be spun and the amino units may be partially alkylated with monochlorides and mono-functional alkylating agents listed above to form anion exchange quaternary groups and partially alkylated with difunctional alkylating agents, such as the dihalides mentioned above, e.g., ethylene dichloride and xylylene dichloride, to effect cross-linking. Polymers of alkyl vinyl sulfides, such as methyl vinyl sulfide, ethyl vinyl sulfide, and isobutyl vinyl sulfide, with cross-linkable units may be reacted with alkylating agents, such as methyl chloride, ethyl chloride, benzyl chloride, allyl chloride, substituted allyl chloride, e.g., dodecylallyl chloride, dodecenyl chlorides, alkylbenzyl chlorides, e.g., octylbenzyl chlorides (from diisobutylene), any chloromethylated aromatic-like compound, e.g., chlorobenzyl chloride, chloromethylated thiophene, chloromethylated furane, chloromethylated napthalene, or corresponding bromides or iodides, e.g., phenoxyethyl bromide, and methyl iodide.

The alkylation step is carried out in any suitable solvent, such as water, benzene, glycol, methanol, ether, dioxane, ethylene dichloride, or mixtures thereof. The temperature may be at room temperature up to the boiling or reflux temperature of the solvent, such as from about 20° C. to 260° C. Preferably, however, a temperature of 40° to 110° C. is used and the solvent is selected to provide a reflux temperature in that range. In the case of alkylating agents which are of gaseous character, a pressure vessel or autoclave is used. A catalyst is not necessary but iodide salts are useful such as sodium iodide. Molar equivalent quantities of the alkylating agent to the sulfide units in the copolymer are used although, if desired, an excess of the alkylating agent may be used. When the resin contains t-amine groups, the alkylating agent may be introduced in sufficient amounts to provide an equivalent to the total of sulfide and t-amine units in the polymer. Alkylation of copolymers of such vinyl sulfides with amine-containing monomers, such as dimethylaminoethyl methacrylate, serves to simultaneously introduce two types of anion exchange units and cross-linking may also be effected by alkylation with a dihalide as above.

The monomers which provide these precursory units in the polymer may be copolymerized with any of the cross-linkable monomers mentioned hereinabove, it only being necessary that the cross-linkable units be resistant to the aminolysis or other treatment necessary to introduce the anion exchange groups in the copolymer.

When using polymers containing precursory units and cross-linkable units for the spinning, the conversion of the precursory units into units having anion exchange groups may be effected before the spinning operation. However, it is usually preferable and more convenient to form the fiber or film from the polymer and to convert the precursory units into the anion exchange units at some stage after such formation and most generally after the cross-linking has been effected, which in turn follows the stretching operation, if stretching is employed.

Whether the polymer being spun or formed into fibers or films is the first type mentioned, which contains, besides cross-linkable units, units having anion exchange groups or the latter type wherein it contains the cross-linkable units with precursory units, the general procedure for spinning is as follows:

The polymers may be formed into structures having at least one small dimension, such as films, sheets, fibers, or filaments, by extrusion, either of a melt of the polymer, a solution thereof in water, if soluble therein, or in an organic solvent or an aqueous dispersion of the copolymer if it is water-insoluble, through an extrusion device containing one or more orifices into a suitable coagulating medium which may be a cooling fluid, gaseous or liquid, in the case of melt-spinning; a heated atmosphere in the case of the dry-spinning of a solution or aqueous dispersion; or a coagulating liquid in the case of wet-spinning a solution or aqueous dispersion. Fibrous structures may also be formed by a spraying technique and so-called "cocoon" protective coverings may also be formed by spraying.

In the melt-spinning of the polymers, provision is made for bringing the polymer mass, which may preferably be in granular or pulverized form, into molten condition in proximity to the spinneret or other extrusion device. This is generally accomplished by providing a suitably heated chamber in proximity to the spinneret or other extrusion device and super-imposing upon the molten mass suitable pressure for forcing the mass through the orifice or orifices of the device. In this procedure, when the polymer being spun contains groups such as alkoxymethylsulfide groups which tend to cross-link on oxidation, cross-linking can be avoided by maintaining an inert atmosphere (that is, excluding oxygen) in contact with the streams which issue from the extrusion device until after stretching is effected on the fibers or films, if stretching is desired. A cooled atmosphere of carbon dioxide, nitrogen, helium, or the like may be maintained within the space into which the molten polymer stream or streams is or are extruded. The temperature of the atmosphere may be from −50° to about 20° C.

Dry- and wet-spinning procedures may be employed with solutions of the polymers in water, if soluble therein, or in organic solvents, such as acetone, dioxane, methyl ethyl ketone, methyl isobutyl ketone, dimethylformamide, dimethylacetamide, acetonitrile, nitromethane, nitroethane, and so on. The concentration of the copolymer in such solutions may be from about 15 to 25%. Similarly, aqueous dispersions of the copolymers made by emulsion copolymerization in aqueous media may be formed into fibers, films, and the like by either dry- or wet-spinning. The concentration of the copolymer in the aqueous dispersions may be from 20 to 70% in wet-spinning or from about 40 to 70% in dry-spinning. Preferably, a concentration of 30 to 50% is used in wet-spinning and about 50 to 55% in dry-spinning. In the dry-spinning of solutions or dispersions of the polymers, the stream or streams of the solution or dispersion issuing from the orifice or orifices of the extrusion device are generally subjected to a heated atmosphere immediately after issuance and for a considerable distance as they travel away from the extrusion device. This is generally effected in a chamber referred to as a spinning cell in which the heated atmosphere is introduced, either near the extrusion device when concurrent flow is desired or at the discharge end of the device when countercurrent flow is desired. The heated atmosphere may have a temperature within the cell ranging from about 30° C. up to 300° C. Generally, if the spinning solution used is made with a volatile organic solvent, the temperature may be in the lower portion of this range, such as from about 30° to 90° C.; whereas when an aqueous solution or aqueous dispersion is being spun, higher temperatures are generally employed in the cell. Specifically, when spinning an aqueous dispersion of an emulsion copolymerization, temperatures of 180° to 400° C. may be employed. In any event, if the filmy structure is formed of a polymer in which the cross-linkable units are self-cross-linking on heating, and it is desired to stretch the structure, excessive temperature or prolonged exposure thereto should be avoided to minimize cross-linking at this stage.

Generally, the formed structures are completely coalesced by the time they leave the spinning cell. However, in the event that the duration and intensity of heat treatment in the spinning cell is inadequate to completely coalesce the polymer particles within the formed structure when an aqueous copolymer dispersion is spun, an additional heating stage may be provided to complete the coalescence. This heating is performed at a temperature sufficiently high to carry the temperature of the shaped structure above the $T_i$ value (apparent second order transition temperature) of the copolymer and preferably at least about 30° above the $T_i$ value thereof.

The apparent second order transition temperature, here symbolized as $T_i$, is defined as that temperature at which the first derivative of thermodynamic variables, such as coefficient of expansion or heat capacity, undergoes a sudden change. The transition temperature is observed as an inflection temperature which is conveniently found by plotting the log of the modulus of rigidity against temperature. A suitable method for determining such modulus and transition temperature is described by Williamson in British Plastics, 23, 87–90. The $T_i$ values here used are generally those temperatures at which the modulus is 300 kg./cm.$^2$. The $T_i$ values referred to are for polymers as such in a dry state unless otherwise designated.

The products, after leaving the spinning cell (whether dry-spinning, wet-spinning, or melt-spinning is used), may then be stretched to any extent desired, such as from about 5% to over 1000% of the length they have before stretching. Preferably, at least 50% stretch is performed on the fiber.

In the wet-spinning of either solutions or aqueous dispersions of the copolymers, the liquid coagulating bath may be aqueous baths containing electrolytes, such as acids, alkalies, or salts. Generally, the electrolyte content should be from 5 to 50% and the temperature of the bath from about 20° to 105° C., preferably 30° to 45° C. However, when acid baths are used, much lower concentrations, even as low as about ½ percent, are effective to lower the pH to a value of 6 or less. Mixtures of the above electrolytes may be employed, such as an acid bath containing salts or an alkaline bath containing salts. Acid baths may be composed of aqueous solutions containing from ½ to 98% of an acid such as sulfuric acid or other inorganic acids such as hydrochloric, phosphoric, boric, or sulfamic, or of organic acids such as oxalic, formic, acetic, citric, lactic, or an alkanesulfonic acid or arylsulfonic acid, such as ethanesulfonic or toluenesulfonic acids. The bath may have a pH value from about 1 to 6 and preferably between 1½ and 4. The bath may contain, besides the acid, buffering salts such as sodium dihydrogen phosphate. The acid baths may also contain small amounts of polyvalent metal salts, such as sulfates, chlorides, or the like of iron (either ferrous or ferric), aluminum, zirconium, tin, cobalt, nickel, and zinc.

Alkaline baths may also be used as the coagulating baths for wet-spinning operations. The pH may be from 8 to 13 and is preferably at least 12 when aqueous dispersions of emulsion copolymers are used. To make up the alkaline baths, there may be used any water-soluble electrolytes or mixtures thereof, such as sodium chloride, lithium chloride, potassium chloride, sodium carbonate, sodium sulfate, sodium acetate, potassium sulfate, sodium or potassium formate, or sodium phosphates of various types including complex phosphates, alkalies, such as sodium or potassium hydroxide, or mixtures of such electrolytes may be used. Alkalinity also may be supplied by a quaternary ammonium hydroxide such as trimethylbenzylammonium hydroxide, hydroxyethyltrimethylammonium hydroxide, or dimethyldibenzylammonium hydroxide. Organic materials such as glucose and urea may also be present in the bath.

Acidic, neutral or alkaline baths containing, as the major component of the solute, salts such as neutral, acidic or basic salts may be employed. For example, a coagulating bath may be composed of aqueous solutions of sodium sulfate, sodium chloride, ammonium chloride, sodium carbonate, sodium bisulfite, sodium acetate, borax, aluminum chloride, and so on.

Wet-spinning may also be performed by extrusion of the solution or dispersion of the polymer into organic liquids which are non-solvents for the polymer but are solvents for the water or organic liquid used for dissolving the polymer to make the spinning solution.

The immersion of the filaments or films in the coagulating bath may vary from a fraction of an inch, such as from ¼ to ½ inch, to several feet, such as three to four feet or more. In wet-spinning, the filaments, after removal from the coagulating bath, may be treated with a neutralizing agent, such as an aqueous acid solution, when an alkaline coagulating bath is used. Whether or not neutralization is first effected, rinsing may be effected such as with water or even with organic liquids, but preferably with water.

The spinneret or like extrusion device may be fed with the dispersion from a suitable feed- or supply-tank by a constant pressure or constant displacement method. This may be accomplished by the use of an oil ram operated either pneumatically, hydraulically, or mechanically. Where no harm is done when the dispersion is subjected directly to air pressure or to the pressure of a suitable gas, compressed air or gas may be introduced into the tank directly over the dispersion under the control of a suitable pressure regulating system in conventional manner. When the dispersions have satisfactory stability against mechanical shear, they may be fed to the spinnerets by suitable pumps and especially the conventional gear pumps which may be provided with the conventional by-pass for controlling the pressure.

The size of the orifices of the spinneret may be from about 0.5 to 10 mils or more up to 20 mils in diameter. For fine filaments, the usual size of orifices, namely 2.5 to 4 mils in diameter, may be used, whereas for larger filaments orifices having diameters of 5 to 9 mils may be used. Orifices of even larger size may be used to produce monofils, and, besides having a round cross-section, they may be of various cross-sections such as oval, eliptical, or of a rectangular slit or slot-like shape to produce ribbons or films of various widths.

The films or filaments may be withdrawn from the extrusion device at the same speed as the linear speed of extrusion or at a speed which is considerably higher or considerably less than the speed of extrusion. For example, the withdrawal speed may be used which is as low as 20% of the linear speed of extrusion or a speed of twice to three times the linear speed of extrusion. The speed of withdrawal may vary from one meter to 100 meters per minute or higher. When a film is produced, it may be wound on a mandrel after completion of the cross-linking operation and preferably after the cross-linked film has been dried. When filaments are produced, they may be collected by winding on a bobbin or in a centrifugal bucket or pot, the latter having the advantage of imparting a small amount of twist, such as from 1½ to 2½ turns per inch, to the filament bundle or yarn when a muti-holed spinneret is used. Collection is preferably made after completion of the cross-linking and drying operations.

During the stretching of the filaments or films, they may be heated to temperatures of 70° to 300° C. by passage through a heated atmosphere or over a smooth, heated plate such as of metal. The extent of stretch may be controlled such as by arranging the heated atmosphere or plate, through or over which the filiments or films pass, between a pair of wheels or godets which have the desired difference in speed so that the linear velocity of the filaments about the periphery of the second godet is a pre-determined greater value from 50 to 1000% or more greater than the peripheral velocity of the first godet.

When an aqueous copolymer dispersion is spun, a fusion-aid may be employed. These materials may be introduced into the aqueous polymer dispersion either before emulsion polymerization of the monomers or after such polymerization. Compounds effective for this purpose have solubility in the polymer and have a favorable distribution coefficient in a polymer-water system. A copolymer of 70 parts of acrylonitrile, 5 parts of a cross-linking comonomer, and 25 parts of 3,3,5-trimethylcyclohexyl acrylate may be used with adiponitrile, α-methylsuccinonitrile, and nitromethane.

Also effective as fusion-aids for polymers formed in major proportion from acrylonitrile or methacrylonitrile are phenylacetonitrile, butyronitrile, hexanitrile, α-methylsuccinonitrile, acrylonitrile, or methacrylonitrile monomers, endomethylenetetrahydrobenzonitrile, succinonitrile, benzonitrile, isobutyrontitrile, and furonitrile.

Toluene, xylene, chlorinated hydrocarbons, such as chloroform and ethylene dichloride, ethyl acetate and butyl acetate are useful fusion-aids for copolymers of 80% methyl methacrylate, 13% of ethyl acrylate, and 7% of a cross-linking co-monomer. From 1 to 40% by weight of a fusion-aid based on the weight of the copolymer may be used, 10 to 20% being preferably used.

When the fibers or films have been stretched longitudinally, the polymer molecules are at least partially oriented along the fiber axis or lengthwise of the film and the extent of orientation depends on the degree of stretch. Heating such fibers or films very quickly causes shrinkage or retraction and loss of a great deal or all of the orientation at relatively low temperatures. By subjecting the stretched fibers or films to the cross-linking procedure of the present invention, the temperature at which substantial shrinkage of the fiber or film occurs is elevated substantially and the extent of shrinkage at a given elevated temperature, such as 200° C. for example, is greatly reduced.

As stated previously, the cross-linking operation may be effected at any stage of the fiber- or filament-forming process. For example, it may be preformed upon the freshly-formed fibers directly after they are removed from the spinneret in a melt-spinning operation. However, it is generally preferable, in order to provide structural products having increased strengths, to stretch the products before effecting the cross-linking thereof. Of course, if, in the particular products desired, there is no need for orientation or stretching to impart greater strength to the products, whether fibers or films the cross-linking may be effected soon after the coalescence of the polymer into the fibrous or pellicular forms has been completed. However, when aqueous copolymer dispersions are spun either by a wet-spinning or dry-spinning operation and a so-called "fuse-drying" stage is employed to effect complete coalescense of the particles into a continuous mass, it is generally desirable and, in most cases, essential that the fuse-drying, which is effected at relatively high temperatures of at least 30° C. above the $T_i$ value of the copolymer (such as from 60° C. to 400° C.), be effected before the cross-linking is effected.

The filaments, fibers, films or threads, cords and fabrics formed thereof may be subjected to other customary finishing processes, such as crimping, curling, twisting, sizing, softening or lubricating, to facilitate weaving, knitting, and other textile operations.

The filaments, threads, or yarns produced by the above described procedural steps are useful in the preparation of various types of fabrics. They are useful in fabrics where controlled shrinkage is desired as in filter cloths.

Uncross-linked fibers or filaments of the present invention, and especially those formed from copolymers containing one-half to 30 mole percent of cross-linkable units, whether stretched or unstretched, may be converted into fabricated structures before the cross-linking is effected by the mild oxidation of the polymer, and then, at some stage during or after the fabrication, the cross-linking may be performed upon the fabric. Fabricating procedures that may be employed include the formation of yarns by twisting together of continuous filaments or by the drafting and twisting of staple fibers formed of the polymers. Also included are plied yarns or cords obtained by doubling two or more of the twisted yarns obtained either from continuous filaments or staple fibers. Besides the yarns and cords, textile fabrics may be formed therefrom by weaving, braiding, or knitting of the yarns. Nonwoven fabrics are contemplated in which the fibers formed of the cross-linked polymers containing ion-exchange groups are distributed haphazardly to form a felt-like or paper-like structure either of low density or of compact structure. For example, such non-woven fabrics may be produced by carding the polymer fibers with or without additional fibers of textile type or paper-making length, such as of woodpulp, cotton, silk, rayon, wool, linen, nylon, polyethylene terephthalate and so on, and subsequently rendering some of the fibers in the products adhesive by heating. The fibers formed of polymers containing ion-exchange groups and cross-linkable units may be relied on for adhesion, in which event the heating thereof in the fabricated structure, mat, woven or knitted textile or the like to tacky condition may be followed by treatment with a cross-linking agent and heating to effect cross-linking and thereby impart reduced swelling and shrinkage and obtain insolubilization and stabilization of the adhered fibers in the structure.

The filmy products are anion-exchanging resins in a special form, adapting them to be applied in a wide variety of ways for the general purposes which are served by such resins including anion-exchange activity, catalytic activity, and other chemical functions, including oxidative activity. They may be modified to enhance any of the particular activities. For example, any of the anion-exchange resin products of the present invention may be treated with an anionic ceric salt, such as an anionic ceric sulfate or nitrate complex, e.g., the former, which can be represented $[Ce(SO_4)_n]^{4-2n}$, in an aqueous solution until the resin is saturated with the complex, to provide oxidative resins having a wide variety of uses where a solid oxidizing agent may be desirable. Thus, such oxidative resins in fiber form may be incorporated in filters used in tobacco products, such as cigars, cigarettes, or in smoker's pipes, to oxidize and/or absorb organic and inorganic components of the smoke drawn through the filter by the smoker. Fine fibers are preferred to provide the maximum surface for carrying the ceric salt.

In the examples, parts and percentages are by weight unless otherwise indicated:

*Example 1*

(a) To 200 parts of distilled water at room temperature are added 6 parts of an aqueous solution containing 2% of ferrous sulfate heptahydrate and 4% of the sodium salt of ethylenediaminotetraacetic acid adjusted to pH 4 with 0.5 N sulfuric acid solution. Then, 3 parts of sodium laurate is added followed by 0.6 part of sodium formaldehyde sulfoxylate·$2H_2O$. The pH of the solution is adjusted to 10.5 with 0.5 N NaOH. A mixture of 50 parts of acrylonitrile and 50 parts of methyl acrylate and 10 parts of adiponitrile is added with stirring, and the air above the resulting emulsion is replaced by nitrogen. To the emulsifier is now added 0.15 part of phenylcyclohexane hydroperoxide as a 10% solution in toluene. After a short induction period, polymerization starts, as evidenced by a sharp temperature rise. The temperature is now controlled by cooling to remain in the range 35° to 40° C. Over 85% conversion to a dispersion of fine particle size (less than 0.1 micron in diameter) is achieved in about one-half hour after addition of the phenylcyclohexane hydroperoxide.

The dispersion prepared as described above is pumped at a rate of 2.8 grams per minute through a spinneret into a coagulating bath. The spinneret consists of a platinum alloy. It has a face diameter of 0.5 inch and contains 40 holes each of 0.0025 inch diameter. The coagulating bath is an aqueous solution of 4% hydrochloric acid which is maintained at 75° C. The bundle of filaments formed is drawn through the bath at a rate of nine meters per minute. The immersion in the bath is four inches. The yarn is washed in water at 60° C. and then in 0.5% borax at 60° C. and dried in contact with a roll coated with polytetrafluoroethylene at 240° C. The yarn is then treated with a solution comprising 40 parts of dimethylaminopropylamine and 60 parts of dodecane at 140° C. for 1½ hours. It is then stretched about 300% while being heated to 110° C. and allowed to cool in the stretched condition. The stretched yarn is treated with 10% p-xylene dichloride in toluene at 50° C. at constant length for one hour and cured at 150° C. at constant length for 40 minutes. The resulting yarn has an anion-exchange capacity of about 2.2 milliequivalents per gram.

*Example 2*

(a) The procedure of Example 1 is repeated except that the stretched yarn is treated with a solution of 10% p-xylylene dichloride and 20% benzyl chloride in toluene instead of the 10% p-xylylene dichloride solution in toluene.

(b) The product of part (a) is treated with 5% sulfuric acid to convert it to the sulfate.

The resinous fibers are supported in a glass tube and through the bed or column of fibers there is slowly passed an aqueous solution containing 26.4 grams of the ceric salt, tetrasulfato-ceric acid of the composition $$Ce(HSO_4)_4$$

and 50 ml. of 96% sulfuric acid per liter of solution. The fibers are rinsed with deionized water, dried, and formed into a cylindrical filter wad for insertion into the end of a cigarette.

*Example 3*

(a) A dispersion of a copolymer of 40 parts of acrylonitrile, 40 parts of methyl acrylate, and 20 parts of methoxymethyl vinyl sulfide is spun and stretched as in Example 1. Then it is soaked in 4% phosphoric acid for 30 minutes at 40° C. The yarn is then soaked for ten minutes in an aqueous solution containing 0.04% NaOH and 1% iodine, the pH of which is adjusted to 9.0 with N/2 $H_2SO_4$, the temperature of this solution being 40° C. The yarn is then held at constant length and heated at 150° C. for one hour.

(b) The cross-linked yarn obtained in part (a) is then treated with a solution comprising 50 parts of dimethylaminopropylamine and 50 parts of dodecane at 100° C. for 4 hours. It is then treated with a 20% solution of benzyl chloride in toluene at 60° C. for one hour and cured at 140° C. for two hours.

*Example 4*

The cross-linked yarn obtained in part (a) of Example 3 is reacted with 100 parts of ethylene diamine at 100° C. for four hours. The amine groups thereby introduced provide basic anion-exchange units and by treatment in an aqueous acid solution, such as hydrochloric or sulfuric, the basic amine groups are converted to the corresponding amine salt groups.

*Example 5*

The cross-linked yarn obtained in part (a) of Example 3 is reacted with 120 parts of diethylene triamine at 120° C. for three hours. The amine groups thereby introduced provide basic anion-exchange units and by treatment in an aqueous acid solution, such as hydrochloric or sulfuric, the basic amine groups are converted to the corresponding amine salt groups.

*Example 6*

An aqueous dispersion of an emulsion copolymer of acrylonitrile (20 parts), ethyl vinyl sulfide (60 parts), and methoxymethyl vinyl sulfide (20 parts) is spun and stretched as in Example 1. Then it is soaked in 4% phosphoric acid for 30 minutes at 40° C. The yarn is then soaked for ten minutes in an aqueous solution containing 0.04% NaOH and 1% iodine, the pH of which is adjusted to 9.0 with N/2 $H_2SO_4$, the temperature of this solution being 40° C. The yarn is then held at constant length and heated at 150° C. for one hour.

The cross-linked yarn (240 parts) thereby obtained is treated in 2000 parts of water containing 280 parts of n-butyl bromide at reflux for eight hours. The resulting yarn containing sulfonium groups may then be washed with ethanol and then with water.

It is to be understood that changes and variations may be made without departing from the spirit and scope of the invention as defined in the appended claims.

We claim:

1. A process for making a filmy product having at least one small dimension of the order of one-tenth to twenty mils comprising extruding, through an orifice of a spinneret into a coagulating medium, a water-insoluble linear addition polymer of at least one compound selected from the group consisting of the amides, nitriles, and esters of acrylic and methacrylic acids to form a filmy product therefrom, converting at least 7 mole percent of the units of the formed polymer into units containing anion-exchange groups selected from the group consisting of amine, amine salt, quaternary ammonium, and sulfonium groups, and reacting about ½ to 50 mole percent of the units of the polymer with a polyfunctional compound to cross-link the polymer molecules, the aforesaid converting and reacting steps being effected while maintaining the form of the polymer.

2. A process for making a filmy product having at least one small dimension of the order of one-tenth to twenty mils comprising extruding, through an orifice of a spinneret into a coagulating medium, a water-insoluble linear addition polymer of acrylonitrile to form a filmy product therefrom, aminolyzing at least 7 mole percent of the units of the formed polymer with a polyamine to introduce amino groups into the formed polymer and cross-linking about ½ to 50 mole percent of the units in the polymer molecules in the formed product by reacting with an organic hydrocarbon dihalide, the aforesaid aminolyzing and reacting steps being effected while maintaining the form of the polymer.

3. A process for making a filmy product having at least one small dimension of the order of one-tenth to twenty mils comprising extruding, through an orifice of a spinneret into a coagulating medium, a water-insoluble linear addition copolymer of methyl acrylate and acrylonitrile to form a filmy product therefrom, aminolyzing at least 7 mole percent of the units of the copolymer in the formed product by reacting it with a dialkylaminoalkylamine, and cross-linking about ½ to 50 mole percent of the units in the polymer molecules of the formed product by reacting it with an aryl dichloride, the aforesaid aminolyzing and reacting steps being effected while maintaining the form of the polymer.

4. A process for making a filmy product having at least one small dimension of the order of one-tenth to twenty mils comprising extruding, through an orifice of a spinneret into a coagulating medium, a water-insoluble linear addition copolymer of methyl acrylate and acrylonitrile to form a filmy product therefrom, aminolyzing at least 7 mole percent of the units of the copolymer in the formed product by reacting it with a di($C_1$–$C_{12}$)-alkylamino-($C_2$–$C_{10}$)alkylamine, and cross-linking about ½ to 50 mole percent of the units in the polymer molecules of the formed product by reacting it with a member selected from the group consisting of aryl dihalides and aliphatic dihalides, the aforesaid aminolyzing and reacting steps being effected while maintaining the form of the polymer.

5. A process for making a filmy product having at least one small dimension of the order of one-tenth to twenty mils comprising extruding, through an orifice of a spinneret into a coagulating medium, a water-insoluble linear addition polymer of at least one compound selected from the group consisting of the amides, nitriles, and esters of acrylic and methacrylic acids to form a filmy product therefrom, reacting the polymer with a diamine having a tertiary amino nitrogen atom and an amino nitrogen atom selected from the group consisting of primary and secondary nitrogen atoms for aminolyzing the units to convert at least 7 mole percent of the units of the formed polymer into units containing amine groups, and reacting about ½ to 50 mole percent of the units of the polymer with a polyfunctional compound to cross-link the polymer molecules, the aforesaid reacting steps being effected while maintaining the form of the copolymer.

6. A process for making a filmy product having at least one small dimension of the order of one-tenth to twenty mils comprising extruding, through an orifice of a spinneret into a coagulating medium, a water-insoluble linear addition polymer of at least one compound selected from the group consisting of the amides, nitriles, and esters of acrylic and methacrylic acids to form a filmy product therefrom, reacting the polymer with a diamine having a tertiary amino nitrogen atom and an amino nitrogen atom selected from the group consisting of primary and secondary nitrogen atoms for aminolyzing the units to convert at least 7 mole percent of the units of the formed polymer into units containing amine groups, and reacting about ½ to 50 mole percent of the units of the polymer with a polyfunctional compound selected from the group consisting of organic hydrocarbon dihalides and polyepoxides, the aforesaid reacting steps being effected while maintaining the form of the copolymer.

7. A process for making a filmy product having at least one small dimension of the order of one-tenth to twenty mils comprising extruding, through an orifice of a spinneret into a coagulating medium, a water-insoluble linear addition polymer of methyl acrylate to form a filmy product therefrom, aminolyzing at least 7 mole percent of the units of the formed polymer with a polyamine to introduce amino groups into the formed polymer and cross-linking about ½ to 50 mole percent of the units in the polymer molecules in the formed product by reacting with an organic hydrocarbon dihalide, the aforesaid aminolyzing and reacting steps being effected while maintaining the form of the polymer.

References Cited by the Examiner
UNITED STATES PATENTS

| | | | |
|---|---|---|---|
| 2,566,255 | 8/1951 | Smith | 260—77.5 |
| 2,648,717 | 8/1953 | Ross et al. | 260—77.5 |
| 2,933,460 | 4/1960 | Richter | 260—2.1 |
| 2,950,503 | 8/1960 | McRae | 260—2.1 |

WILLIAM H. SHORT, *Primary Examiner.*

MILTON STERMAN, H. N. BURSTEIN, *Examiners.*